United States Patent
Kinoshita et al.

(10) Patent No.: US 7,608,363 B2
(45) Date of Patent: Oct. 27, 2009

(54) NON-AQUEOUS ELECTROLYTE SECONDARY BATTERY WITH VINYLENE CARBONATE AND DIVINYL SULFONE CONTAINING ELECTROLYTE

(75) Inventors: Akira Kinoshita, Kobe (JP); Hiroyuki Fujimoto, Kobe (JP); Yasufumi Takahashi, Kobe (JP); Shingo Tode, Kobe (JP); Kazuhiro Hasegawa, Kobe (JP); Shin Fujitani, Kobe (JP)

(73) Assignee: Sanyo Electric Co., Ltd., Osaka (JP)

(*) Notice: Subject to any disclaimer, the term of this patent is extended or adjusted under 35 U.S.C. 154(b) by 582 days.

(21) Appl. No.: 11/140,064

(22) Filed: May 31, 2005

(65) Prior Publication Data

US 2006/0105240 A1     May 18, 2006

(30) Foreign Application Priority Data

Nov. 16, 2004   (JP)   ............... 2004-332208

(51) Int. Cl.
*H01M 4/52*     (2006.01)
*H01M 10/08*    (2006.01)

(52) U.S. Cl. .................... 429/231.3; 429/326
(58) Field of Classification Search .............. 429/231.3
See application file for complete search history.

(56) References Cited

U.S. PATENT DOCUMENTS

| | | | |
|---|---|---|---|
| 6,277,521 B1 | 8/2001 | Gao et al. | 429/231.1 |
| 6,534,216 B1 | 3/2003 | Narukawa et al. | 429/224 |
| 6,582,852 B1 | 6/2003 | Gao et al. | 429/231.1 |
| 6,927,001 B1 * | 8/2005 | Hamamoto et al. | 429/332 |
| 2002/0127473 A1 | 9/2002 | Ooya et al. | 429/232 |
| 2003/0148190 A1 * | 8/2003 | Hamamoto et al. | 429/326 |
| 2003/0170549 A1 * | 9/2003 | Murai | 429/329 |
| 2004/0076882 A1 | 4/2004 | Hosoya et al. | 429/223 |
| 2004/0121240 A1 * | 6/2004 | Hamamoto et al. | 429/340 |
| 2005/0069774 A1 | 3/2005 | Miyazaki et al. | 429/231.3 |

FOREIGN PATENT DOCUMENTS

EP     1 391 959 A2     2/2004

(Continued)

OTHER PUBLICATIONS

Yoshio, Masaki, et al., "Preparation and properties of $LiCo_yMn_xNi_{1-x-y}O_2$ as a cathode for lithium ion batteries", *Journal of Power Sources*, vol. 90, pp. 176-181 (2000).

(Continued)

*Primary Examiner*—Mark Ruthkosky
(74) *Attorney, Agent, or Firm*—Kubovcik & Kubovcik (57) ABSTRACT

A non-aqueous electrolyte secondary battery including a positive electrode containing a positive active material, a negative electrode containing a negative active material and a non-aqueous electrolyte, characterized in that lithium transition metal complex oxide A formed by allowing $LiCoO_2$ to contain at least both of Zr and Mg and lithium transition metal complex oxide B having a layered structure and containing at least both of Mn and Ni as transition metals are mixed and used as said positive active material, and vinylene carbonate and divinyl sulfone are contained in said non-aqueous electrolyte.

12 Claims, 2 Drawing Sheets

FOREIGN PATENT DOCUMENTS

| | | | |
|---|---|---|---|
| EP | 1 465 271 A1 | 10/2004 |
| JP | 08-250120 A | 9/1996 |
| JP | 2561556 B2 | 9/1996 |
| JP | 9-293536 A | 11/1997 |
| JP | 2855877 B2 | 11/1998 |
| JP | 3045998 B2 | 3/2000 |
| JP | 2000-215884 A | 8/2000 |
| JP | 2001-52704 A | 2/2001 |
| JP | 2001-57234 A | 2/2001 |
| JP | 3244314 B2 | 10/2001 |
| JP | 2001-351624 A | 12/2001 |
| JP | 2002-42813 A | 2/2002 |
| JP | 2002-164053 A | 6/2002 |
| JP | 2002-319398 A | 10/2002 |
| JP | 2003-500318 A1 | 1/2003 |
| JP | 2003-86181 A | 3/2003 |
| JP | 2003-109599 A | 4/2003 |
| JP | 2003-168430 A | 6/2003 |
| JP | 2003-203631 A | 7/2003 |
| JP | 2003-203673 A | 7/2003 |
| JP | 2003-221234 A | 8/2003 |
| JP | 2003-331921 A | 11/2003 |
| JP | 2004-31165 A | 1/2004 |
| JP | 2004-47180 A | 2/2004 |
| JP | 2004-47437 A | 2/2004 |
| JP | 2004-103566 A | 4/2004 |
| WO | 2004/040676 A1 | 5/2004 |
| WO | 2005/015663 A1 | 2/2005 |
| WO | 2005/093880 A1 | 10/2005 |

OTHER PUBLICATIONS

Lu, Zhonghua, et al., *Layered Li[$Ni_xCo_{1-2x}Mn_x$]$O_2$ Cathode Materials for Lithium-Ion Batteries*, Electrochemical and Solid-State Letters, vol. 4 (12) pp. A200-A203(2001).

Koyama, Yukinori, et al., *Lithium Insertion Material of $LiCo_{1/3}Ni_{1/3}Mn_{1/3}O_2$ for Advanced Batteries: (I) Prediction on the Crystal and Electronic Structure*, the 42$^{nd}$ Battery Symposium in Japan, The Committee of Battery Technology, Nov. 21-23, 2001, Yokohama pp. 50-51.

Xu, H.Y. et al., "Improving the electrochemical behavior of $LiCoO_2$ electrode by mixed Zr-Mg doping", *Journal of Power Sources*, 148 (2005), pp. 90-94.

* cited by examiner

NON-AQUEOUS ELECTROLYTE SECONDARY BATTERY WITH VINYLENE CARBONATE AND DIVINYL SULFONE CONTAINING ELECTROLYTE

BACKGROUND OF THE INVENTION

1. Field of the Invention

The present invention relates to a non-aqueous electrolyte secondary battery such as a lithium secondary battery.

2. Description of the Related Art

In recent years, anon-aqueous electrolyte secondary battery, in which an alloy, lithium metal or a carbon material capable of occluding/releasing lithium ions is used as a negative active material and a lithium transition metal complex oxide expressed by a chemical formula $LiMO_2$ (M is a transition metal) is used as a positive active material, is noted as a battery having a high energy density.

As the above-mentioned lithium transition metal complex oxide, lithium cobalt complex oxide ($LiCoO_2$) is given as a typical one, and it has already become commercially practical as a positive active material of the non-aqueous electrolyte secondary battery.

In the non-aqueous electrolyte secondary battery in which a lithium transition metal complex oxide such as lithium cobalt oxide is used as a positive active material and a carbon material is used as a negative active material, 4.1 to 4.2 V is generally employed as the end of charge voltage. In this case, the positive active material is utilized only by 50 to 60% with respect to its theoretical capacity. Therefore, if the end of charge voltage is more raised, a capacity (coefficient of use) of a positive electrode can be improved and the capacity and the energy density of the battery can be enhanced.

However, if the end of charge voltage is raised, the deterioration of a structure of $LiCoO_2$ and the decomposition of an electrolyte solution at the surface of the positive electrode become apt to occur. Therefore, there was a problem that deterioration of the battery due to charge-discharge cycles becomes more remarkable than the conventional case of employing 4.1 to 4.2 V as the end of charge voltage.

On the other hand, of lithium transition metal complex oxide expressed by a chemical formula $LiMO_2$ (M represents transition metals), compounds containing Mn and Ni as transition metals have been studied and also materials containing all three kinds of transition metals of Mn, Ni and Co have been actively studied as shown in Japanese Patent Publication No. 2561556, Japanese Patent Publication No. 3244314 and Journal of Power Sources 90 (2000) 176-181.

It is reported that among the lithium transition metal complex oxides containing Mn, Ni and Co, a compound in which compositions of Mn and Ni are equal exhibits specifically high thermal stability even in a charging state (high oxidation state) in Electrochemical and Solid-State Letters, 4(12) A200-A203 (2001) Also, it is reported that complex oxide, in which Mn is substantially equal to Ni, has a voltage of around 4V equal to that of $LiCoO_2$ and exhibits a high capacity and excellent charge-discharge efficiency in Japanese Unexamined Patent Publication No. 2002-42813.

In such a battery in which lithium transition metal complex oxide containing Mn, Ni and Co and having a layered structure is used as a positive active material, it can be expected that reliability of the battery is dramatically improved by virtue of high thermal stability during charging even when the end of charge voltage of the battery is raised to deepen the depth of charge capacity of a positive electrode.

However, the present inventors studied on a battery in which lithium transition metal complex oxide containing Mn, Ni and Co is used as a positive active material and as a result have found that when the end of charge voltage is raised, the deterioration of a structure of the positive active material and the decomposition of an electrolyte solution at the surface of the positive electrode become apt to occur and reduction in a battery capacity due to the charge-discharge cycles becomes more remarkable than the conventional case of employing 4.1 to 4.2 V as the end of charge voltage.

In order to solve the above-mentioned problems, the present inventors have proposed in Japanese patent application No. 2004-94475 not laid open that lithium transition metal complex oxide formed by allowing $LiCoO_2$ to contain Zr and Mg and lithium transition metal complex oxide having a layered structure and containing at least Mn and Ni as transition metals are mixed and this mixture is used as a positive active material.

But, the present inventors have further studied and as a result they have found that as described in Reference Example described later, if a capacity per volume of the battery is more increased by increasing a proportion of the positive active material and the negative active material in the battery in order to further enhance the capacity of the battery, deterioration of the battery due to charge-discharge cycles is apt to occur when a voltage of 4.3 V or higher is employed as an end of charge voltage even though the positive active material described in Patent Application No. 2004-94475 is used.

The present invention is one to improve a charge-discharge cycle characteristic in increasing a discharge capacity per volume of the battery in the non-aqueous electrolyte secondary battery in which the positive active material described in the above-mentioned Patent Application No. 2004-94475 is used and a voltage of 4.3 V or higher is employed as an end of charge voltage.

SUMMARY OF THE INVENTION

It is an object of the present invention to provide a non-aqueous electrolyte secondary battery in which an end of charge voltage can be 4.3 V or higher without deteriorating a charge-discharge cycle characteristic and thermal stability, and thereby a charge-discharge capacity can be enhanced.

The present invention pertains to a non-aqueous electrolyte secondary battery including a positive electrode containing a positive active material, a negative electrode containing a negative active material and a non-aqueous electrolyte and is characterized in that lithium transition metal complex oxide A formed by allowing $LiCoO_2$ to contain at least both of Zr and Mg and lithium transition metal complex oxide B having a layered structure and containing at least both of Mn and Ni as transition metals are mixed and used as the above-mentioned positive active material, and vinylene carbonate and divinyl sulfone are contained in the above-mentioned non-aqueous electrolyte.

In the present invention, since the mixture of the above-mentioned lithium transition metal complex oxide A and the above-mentioned lithium transition metal complex oxide B is used as a positive active material, the end of charge voltage can be 4.3 V or higher without deteriorating a charge-discharge cycle characteristic and thermal stability, and thereby a charge-discharge capacity can be enhanced. And, in the present invention, since the vinylene carbonate and the divinyl sulfone are contained in the non-aqueous electrolyte, a charge-discharge cycle characteristic can be further improved.

The reason why the charge-discharge cycle characteristic can be improved by containing the vinylene carbonate and the divinyl sulfone in the non-aqueous electrolyte is considered to be that a coating formed by decomposition of the divinyl sulfone inhibits a reaction between the positive electrode and the non-aqueous electrolyte and simultaneously a coating formed by decomposition of the vinylene carbonate is formed on a negative electrode and therefore a side reaction is inhibited in both sides of the positive electrode and the negative electrode.

In the present invention, it is preferred that 1,4-butane-dioldimethanesulfonate is further contained in the non-aqueous electrolyte. By further containing 1,4-butane-dioldimethanesulfonate, the charge-discharge cycle characteristic is further improved. The reason for this is not clear, but it is considered to be that 1,4-butanedioldimethanesulfonate and divinyl sulfone are decomposed in stages to form a coating on the positive electrode and thereby a coating containing sulfur becomes tighter.

In the present invention, the content of the vinylene carbonate is preferably 0.5 to 5% by weight with respect to the entire non-aqueous electrolyte, and more preferably 1 to 3% by weight. When the content of the vinylene carbonate is too less, there may be cases where an effect of improving the charge-discharge cycle characteristic of the present invention is not adequately attained. And, when it is too much, the coating formed on the negative electrode becomes too thick and this may have a detrimental effect on battery performance.

In the present invention, the content of the divinyl sulfone is preferably 0.1 to 1% by weight with respect to the entire non-aqueous electrolyte. When the content of the divinyl sulfone is too less, there may be cases where an effect of improving the charge-discharge cycle characteristic of the present invention is not adequately attained. When it is too much, the coating formed on the surface of the positive electrode becomes too thick and this may have a detrimental effect on battery performance.

In the present invention, when 1,4-butanedioldimethanesulfonate is contained in the non-aqueous electrolyte, the content of 1,4-butanedioldimethanesulfonate is preferably 0.1 to 1.5% by weight with respect to the entire non-aqueous electrolyte. When the content of 1,4-butanedioldimethanesulfonate is too less, there may be cases where an effect of improving the charge-discharge cycle characteristic by addition of 1,4-butanedioldimethanesulfonate is not adequately attained. And, when it is too much, the coating formed on the surface of the positive electrode becomes too thick and this may have a detrimental effect on battery performance.

In the present invention, since the mixture of the above lithium transition metal complex oxide A and the above lithium transition metal complex oxide B is used as a positive active material. By using such a mixture as a positive active material, the end of charge voltage can be 4.3 V or higher without deteriorating a charge-discharge cycle characteristic and thermal stability. Hereinafter, the reason for this will be described.

The reason why the charge-discharge cycle characteristic is deteriorated in using a conventional $LiCoO_2$ as a positive active material and raising the end of charge voltage to 4.3 V or higher is not clear in detail, but it is assumed that the deterioration of the charge-discharge cycle characteristic results from decomposition of an electrolyte, generated by a catalyticaction, on the surface of an active material, of Co of which oxidation state is enhanced during charging, and destruction of a crystal structure of $LiCoO_2$. It is considered that by allowing $LiCoO_2$ to contain Zr and Mg, the oxidation state of Co is changed and the decomposition of an electrolyte solution or the destruction of a crystal structure of $LiCoO_2$ is reduced in the lithium transition metal complex oxide A in the present invention.

As described above, the lithium transition metal complex oxide A exhibits a good charge-discharge cycle characteristic even when the end of charge voltage is enhanced. On the other hand, the lithium transition metal complex oxide B exhibits high thermal stability. In the present invention, by mixing and using such a lithium transition metal complex oxide A and lithium transition metal complex oxide B, there can be formed a positive active material having both of the excellent cycle characteristic of the lithium transition metal complex oxide A and the excellent thermal stability of the lithium transition metal complex oxide B. Therefore, in accordance with the present invention, the end of charge voltage can be 4.3 V or higher without deteriorating a charge-discharge cycle characteristic and thermal stability, and thereby a charge-discharge capacity can be enhanced.

In the present invention, it is preferred that Zr adheres to the surface of the lithium transition metal complex oxide A as a compound. That is, it is preferred that Zr is contained in the lithium transition metal complex oxide A through the adhesion of a compound of Zr to the surface of the lithium transition metal complex oxide A. And, it is preferred that a compound of Zr adheres to the surface of the lithium transition metal complex oxide A in the form of a particle. The adhesion of Zr to the surface of the lithium transition metal complex oxide A is considered not to contribute to stabilization of a crystal structure of the lithium transition metal complex oxide A but to facilitate the delivery and receipt of lithium ions and electrons at the surface of the lithium transition metal complex oxide A during charging and discharging and to enable to inhibit the oxidation decomposition of an electrolyte solution, which is a degrading reaction.

And, it is verified that when Mg is added, Mg elements are diffused into both of the compound containing Zr and the lithium transition metal complex oxide A and simultaneously the compound containing Zr and the lithium transition metal complex oxide A are sintered in a robust state. Accordingly, it is considered that the addition of Mg strengthens a joining state between the compound containing Zr and the lithium transition metal complex oxide A and substantially increases an effect of inhibiting the decomposition of an electrolyte solution.

As the lithium transition metal complex oxide A, there can be used, for example, a compound expressed by $Li_a Co_{1-x-y-z}Zr_xMg_yM_zO_2$, wherein M is at least one element selected from Al, Ti and Sn and a, x, y and z are numerals satisfying equations of $0 \leq a \leq 1.1$, $x > 0$, $y > 0$, $z \geq 0$ and $0 < x+y+z \leq 0.03$.

It is preferred that lithium transition metal complex oxide B contains Co as transition metals and further an amount of Mn is substantially equal to an amount of Ni. Preferably, the amount of Mn and the amount of Ni in the lithium transition metal complex oxide B are substantially equal in order to have the best balance between the property of Mn, in which a capacity is small but thermal stability during charging is high, and the property of Ni, in which a capacity is large but thermal stability during charging is low.

As the lithium transition metal complex oxide B, there can be used, for example, a compound expressed by $Li_bMn_sNi_tCo_uO_2$, wherein b, s, t and u are numerals satisfying equations of $0 \leq b \leq 1.2$, $s+t+u=1$, $0 < s \leq 0.5$, $0 < t \leq 0.5$ and $u \geq 0$.

A proportion of the positive active material which the lithium transition metal complex oxide A makes up is preferably within the range of 51 to 90% by weight. Therefore, a proportion of the lithium transition metal complex oxide B is preferably within the range of 49 to 10% by weight. By setting the above proportion within this range, both of the charge-discharge cycle characteristic and the thermal stability of the battery can be attained.

In the present invention, when a battery capacity is enhanced by raising the end of charge voltage, the ratio between charge capacities of the opposite portions in the positive electrode and the negative electrode (negative electrode charge capacity/positive electrode charge capacity) at an end of charge voltage to be a design basis is preferably within the range of 1.0 to 1.2. By setting the ratio between charge capacities of the positive electrode and the negative electrode at 1.0 or more like this, it is possible to prevent metal lithium from depositing on the surface of the negative electrode. That is, the ratio between charge capacities of the opposite portions in the positive electrode and the negative electrode (negative electrode charge capacity/positive electrode charge capacity) is preferably within the range of 1.0 to 1.2 in designing the end of charge voltage either to be 4.3 V or to be 4.4 V. Further, the negative active material in this case is an active material other than lithium metal. In addition, when the end of charge voltage is higher than 4.4 V, an effect of inhibiting the decomposition of an electrolyte solution or the destruction of a positive electrode becomes insufficient, and therefore the end of charge voltage is preferably 4.4 V or lower.

As described above, the vinylene carbonate and the divinyl sulfone are contained in the non-aqueous electrolyte used in the present invention. As a solvent to be a main component of the non-aqueous electrolyte, there can be used a substance which has been previously used as a solvent of an electrolyte of a lithium secondary battery. Among others, a mixed solvent of a cyclic carbonate and a chain carbonate is particularly preferably used. As the cyclic carbonate, there are given ethylene carbonate, propylene carbonate, butylene carbonate and the like. As the chain carbonate, there are given dimethyl carbonate, ethyl methyl carbonate, diethyl carbonate and the like.

It is desired that a solvent used for an electrolyte solution of the non-aqueous electrolyte secondary battery according to the present invention contains diethyl carbonate as a chain carbonate. The reason for this is that by using such an electrolyte solution, an oxidation-decomposition reaction of an electrolyte solution in a highly charged state and at elevated temperature becomes harder to proceed. And, since an oxidation-decomposition reaction of the non-aqueous electrolyte becomes apt to proceed more in a highly charged state and at elevated temperature particularly when ethyl methyl carbonate is contained as a chain carbonate, an remarkable effect of adding vinylene carbonate and divinyl sulfone according to the present invention is obtained when ethyl methyl carbonate is contained in the non-aqueous electrolyte.

And, since the cyclic carbonate generally tends to decompose at a high potential, a proportion of the cyclic carbonate in the total solvent is preferably 10 to 50% by volume and more preferably 20 to 30% by volume when the battery is charged at a high voltage of 4.3 V or higher.

And, when a graphite material is used as a negative active material, ethylene carbonate is preferably used as a cyclic carbonate. However, since ethylene carbonate tends to decompose at a high potential, propylene carbonate and/or butylene carbonate, which is resistant to oxidation decomposing, may be employed instead of ethylene carbonate in order to inhibit the decomposition at a high potential.

As a solute of the non-aqueous electrolyte in the present invention, there can be used lithium salt generally used as a solute in the lithium secondary battery. As such lithium salt, there are exampled $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. Among them, $LiPF_6$ (lithium hexafluorophosphate) is preferably used. When the battery is charged at a high charge voltage, aluminum which is a collector of the positive electrode becomes apt to dissolve but if $LiPF_6$ exists, a coating is formed on the surface of aluminum through decomposition of $LiPF_6$ and this coating can inhibits the dissolution of aluminum. Accordingly, it is preferred to use $LiPF_6$ as lithium salt.

And, in the present invention, the positive electrode may contain a conductive material. When a carbon material is contained as a conductive material, the content of the carbon material is preferably 5% by weight or lower with respect to the total of the positive active material, the conductive material and the binder. The reason for this is that the electrolyte solution is apt to decompose on the surface of the carbon material in charging at a particularly high end of charge voltage.

As the negative active material used in the present invention, a compound which can be employed as a negative active material of a lithium secondary battery may be used and includes, for example, carbon materials such as graphite and metal materials such as silicon, tin and aluminum, which forms an alloy with lithium. In the present invention, a graphite material is particularly preferably used.

In accordance with the present invention, by mixing and using the lithium transition metal complex oxide A formed by allowing $LiCoO_2$ to contain at least both of Zr and Mg and the lithium transition metal complex oxide B having a layered structure and containing at least both of Mn and Ni as transition metals, the end of charge voltage can be 4.3 V or higher without deteriorating a charge-discharge cycle characteristic and thermal stability, and thereby a charge-discharge capacity of the non-aqueous electrolyte secondary battery can be enhanced.

And, a charge-discharge cycle characteristic can be further improved by containing the vinylene carbonate and the divinyl sulfone in the non-aqueous electrolyte in accordance with the present invention.

DESCRIPTION OF THE PREFERRED EXAMPLES

Hereinafter, the present invention will be described in more detail by way of examples, but the present invention is not limited by the following examples and can be appropriately modified to embody as long as its gist is not modified.

<Experiment 1>

Example 1

[Preparation of $LiCo_{0.993}Zr_{0.002}Mg_{0.005}O_2$]

$Li_2CO_3$, $Co_3O_4$, $ZrO_2$ and MgO were mixed in an Isikawa type grinding mortar in such a way that a molar ratio of Li, Co, Zr and Mg is 100:99.3:0.2:0.5 and then heat treated at 850° C. for 24 hours in an air atmosphere, and then the heat treated mixture was milled to obtain $LiCo_{0.993}Zr_{0.002}Mg_{0.005}O_2$ having an average particle diameter of about 14 μm.

[Preparation of $LiMn_{0.33}Ni_{0.33}Co_{0.34}O_2$]

LiOH and coprecipitation hydroxide expressed by $Mn_{0.33}Ni_{0.33}Co_{0.34}(OH)_2$ were mixed in an Isikawa type grinding mortar in such a way that a molar ratio of Li and overall transition metals is 1:1 and then heat treated at 1,000° C. for 20 hours in an air atmosphere, and then the heat treated mixture was milled to obtain $LiMn_{0.33}Ni_{0.33}Co_{0.34}O_2$ having an average particle diameter of about 5 μm.

[Preparation of Positive Electrode]

$LiCo_{0.993}Zr_{0.002}Mg_{0.005}O_2$ and $LiMn_{0.33}Ni_{0.33}Co_{0.34}O_2$ thus obtained were mixed in an Isikawa type grinding mortar in such a way that a weight ratio of these two compounds is 7:3 to obtain a positive active material. Next, poly vinylidene fluoride as a binder was dissolved in N-methyl-2-pyrrolidone as a dispersing medium and to this solution, a positive active material and a carbon as a conductive material were further added in such a way that the weight ratio of the active material, the conductive material and the binder is 90:5:5 and the resulting mixture was kneaded to prepare slurry for the positive electrode. After the prepared slurry was applied onto an aluminum foil as a collector, it was dried and then rolled out with a roller, and a positive electrode was fabricated by attaching a collecting tab to the collector.

[Preparation of Negative Electrode]

To a solution formed by dissolving carboxymethylcellulose as a thickener in water, artificial graphite as a negative active material and a styrene butadiene rubber as a binder were added in such a way that the weight ratio of the active material, the binder and the thickener is 95:3:2 and then the resulting mixture was kneaded to prepare slurry for the negative electrode. After the prepared slurry was applied on to a copper foil as a collector, it was dried and then rolled out with a roller, and a negative electrode was fabricated by attaching a collecting tab to the collector.

[Preparation of Electrolyte Solution]

Ethylene carbonate (EC), ethyl methyl carbonate (EMC) and diethyl carbonate (DEC) were mixed so as to be 2:5:3 in a volumetric ratio to form a solvent and in this solvent, lithium hexafluorophosphate was dissolved so as to be 1 mol/l in its concentration. To this solution, vinylene carbonate (VC) and divinyl sulfone (VS) were added in the proportions of 2.0 parts by weight and 0.3 parts by weight, respectively, with respect to 97.7 parts by weight of this solution and the mixture was dissolved to prepare an electrolyte solution.

[Fabrication of Battery]

The positive electrode and the negative electrode thus obtained were taken up so as to be placed on opposite sides of a separator to prepare a roll, and a non-aqueous electrolyte secondary battery A1, which has a design capacity of 820 mAh and has a size of 5.5 mm thick×3.4 cm wide×3.6 cm long as a battery standardized size, was obtained by encapsulating the roll together with an electrolyte solution in an aluminum laminate in a glove box under an atmosphere of argon. In addition, a design discharge capacity per volume of the battery was 122 Ah/liter.

Here, amounts of the positive active material and the negative active material used are determined in such a way that the ratio between charge capacities of the opposite portions in the positive electrode and the negative electrode (negative electrode charge capacity/positive electrode charge capacity) in the case where 4.4 V is selected as an end of charge voltage is 1.05. In addition, this ratio between charge capacities of the positive electrode and the negative electrode will be similarly used in the following Examples and Comparative Example.

[Evaluation of Charge-discharge Cycle Characteristic]

The non-aqueous electrolyte secondary battery A1 was charged at a constant current of 820 mA at room temperature until a voltage reaches 4.38 V and further charged at a constant voltage of 4.38 V until a current value reaches 16 mA and then discharged at a constant current of 820 mA until a voltage reaches 3.0 V, and thereby a discharge capacity (mAh) of the battery was measured. By repeating this charge and discharge, the charge-discharge cycle characteristic was evaluated. The results of evaluation are shown in Table 1.

Example 2

A non-aqueous electrolyte secondary battery A2 was fabricated by following the same procedure as in Example 1 except for changing the procedure in the above preparation of electrolyte solution in Example 1 in such a way that VC, VS and 1,4-butanedioldimethanesulfonate (BDDMS) were added to the solution in the proportions of 2.0 parts by weight, 0.3 parts by weight and 1.0 parts by weight, respectively, with respect to 96.7 parts by weight of the solution and dissolved therein, and the charge-discharge cycle characteristic of the battery A2 was evaluated. The results of evaluation are shown in Table 1.

Comparative Example 1

A non-aqueous electrolyte secondary battery X1 was fabricated by following the same procedure as in Example 1 except for changing the procedure in the above preparation of electrolyte solution in Example 1 in such a way that VC was added to the solution in the proportion of 2.0 parts by weight with respect to 98 parts by weight of the solution and dissolved therein, and the charge-discharge cycle characteristic of the battery X1 was evaluated. The results of evaluation are shown in Table 1.

Here, in Table 1, capacity retention represents a capacity ratio to an initial discharge capacity.

TABLE 1

|  | Battery | EC Content in Solvent | Materials Added to Electrolyte Solution | Capacity Retention at 250th Cycle | Capacity Retention at 300th Cycle |
| --- | --- | --- | --- | --- | --- |
| Example 1 | A1 | 20% by Volume | VC + VS | 82.5% | 54.2% |
| Example 2 | A2 | 20% by Volume | VC + VS + BDDMS | 85.2% | 82.0% |
| Comparative Example 1 | X1 | 20% by Volume | VC | 55.3% | Cancellation of Test |

As is apparent from the results shown in Table 1, it is found that the cycle characteristic is improved in Examples 1 and 2 in which both of VC and VS are contained in the electrolyte solution compared with Comparative Example 1 in which only VC is contained in the electrolyte solution. Further, it is found that the cycle characteristic is further improved in Example 2 in which VC, VS and BDDMS are contained in the electrolyte solution compared with Example 1 in which VC and VS are contained in the electrolyte solution.

<Reference Experiment>

Reference Example 1

[Preparation of $LiCo_{0.99}Zr_{0.005}Mg_{0.005}O_2$]

$Li_2CO_3$, $Co_3O_4$, $ZrO_2$ and MgO were mixed in an Isikawa type grinding mortar in such a way that a molar ratio of Li, Co, Zr and Mg is 100:99:0.5:0.5 and then heat treated at 850° C. for 24 hours in an air atmosphere, and then the heat treated mixture was milled to obtain $LiCo_{0.99}Zr_{0.005}Mg_{0.005}O_2$ having an average particle diameter of about 14 μm.

[Preparation of $LiMn_{0.33}Ni_{0.33}Co_{0.34}O_2$]

LiOH and coprecipitation hydroxide expressed by $Mn_{0.33}Ni_{0.33}Co_{0.34}$ $(OH)_2$ were mixed in an Isikawa type grinding mortar in such a way that a molar ratio of Li and overall transition metals is 1:1 and then heat treated at 1,000° C. for 20 hours in an air atmosphere, and then the heat treated mixture was milled to obtain $LiMn_{0.33}Ni_{0.33}Co_{0.34}O_2$ having an average particle diameter of about 5 μm.

[Preparation of Positive Electrode]

$LiCo_{0.99}Zr_{0.005}Mg_{0.005}O_2$ and $LiMn_{0.33}Ni_{0.33}Co_{0.34}O_2$ thus obtained were mixed in an Isikawa type grinding mortar so as to be 7:3 in a weight ratio to obtain a positive active material. Next, poly vinylidene fluoride as a binder was dissolved in N-methyl-2-pyrrolidone as a dispersing medium and to this solution, a positive active material and a carbon as a conductive material were further added in such a way that the weight ratio of the active material, the conductive material and the binder is 90:5:5 and the resulting mixture was kneaded to prepare slurry for the positive electrode. After the prepared slurry was applied onto an aluminum foil as a collector, it was dried and then rolled out with a roller, and a positive electrode was fabricated by attaching a collecting tab to the collector.

[Preparation of Negative Electrode]

To an aqueous solution formed by dissolving carboxymethylcellulose as a thickener in water, artificial graphite as a negative active material and a styrene butadiene rubber as a binder were added in such a way that the weight ratio of the active material, the binder and the thickener is 95:3:2 and then the resulting mixture was kneaded to prepare slurry for the negative electrode. After the prepared slurry was applied onto a copper foil as a collector, it was dried and then rolled out with a roller, and a negative electrode was fabricated by attaching a collecting tab to the collector.

[Preparation of Electrolyte Solution]

Ethylene carbonate and diethyl carbonate were mixed so as to be 3:7 in a volumetric ratio to form a solvent and in this solvent, $LiPF_6$ was dissolved so as to be 1 mol/l in its concentration to prepare an electrolyte solution.

[Fabrication of Battery]

The positive electrode and the negative electrode thus obtained were taken up so as to be placed on opposite sides of a separator to prepare a roll, and a non-aqueous electrolyte secondary battery B1, which has a design capacity of 650 mAh and has a size of 3.6 mm thick×3.5 cm wide×6.2 cm long as a battery standardized size, was obtained by encapsulating the roll together with an electrolyte solution in an aluminum laminate in a glove box under an atmosphere of argon. In addition, a design discharge capacity per volume of the battery was 83 Ah/liter. The capacity per volume of the battery lower than that of the battery described in Examples and Comparative Example shown in Experiment 1 of this specification results from that a proportion of the electrode which the active material of this case makes up is reduced compared with the battery described in the above-mentioned Experiment 1.

Here, amounts of the positive active material and the negative active material used are determined in such a way that the ratio between charge capacities of the opposite portions in the positive electrode and the negative electrode (negative electrode charge capacity/positive electrode charge capacity) in the case where 4.4 V is selected as an end of charge voltage is 1.15. In addition, this ratio between charge capacities of the positive electrode and the negative electrode will be similarly used in the following Reference Examples and Reference Comparative Example.

[Evaluation of Thermal Stability]

The non-aqueous electrolyte secondary battery B1 was charged at a constant current of 650 mA at room temperature until a voltage reaches 4.45 V and further charged at a constant voltage of 4.45 V until a current value reaches 32 mA. Then, the battery was heated at a rate of 5° C./minute from room temperature to a set temperature and maintained at the set temperature for 2 hours, and thereby the thermal stability was evaluated.

[Evaluation of Charge-discharge Cycle Characteristic]

The non-aqueous electrolyte secondary battery B1 was charged at a constant current of 650 mA at room temperature until a voltage reaches 4.4 V and further charged at a constant voltage of 4.4 V until a current value reaches 32 mA and then discharged at a constant current of 650 mA until a voltage reaches a set voltage, and thereby a discharge capacity (mAh) of the battery was measured. By repeating this charge and discharge, the charge-discharge cycle characteristic was evaluated.

Reference Example 2

A non-aqueous electrolyte secondary battery B2 was fabricated by following the same procedure as in Reference Example 1 except for changing the procedure in the above preparation of positive electrode in Reference Example 1 in such a way that $LiCo_{0.99}Zr_{0.005}Mg_{0.005}O_2$ and $LiMn_{0.33}Ni_{0.33}Co_{0.34}O_2$ were mixed so as to be 8:2 in a weight ratio, and the thermal stability and the charge-discharge cycle characteristic of the battery B2 were evaluated.

Reference Comparative Example 1

A non-aqueous electrolyte secondary battery Y1 was fabricated by following the same procedure as in Reference Example 1 except for changing the procedure in the above preparation of positive electrode in Reference Example 1 so as to use only $LiCo_{0.99}Zr_{0.005}Mg_{0.005}O_2$ as a positive active material, and the thermal stability and the charge-discharge cycle characteristic of the battery Y1 were evaluated.

Reference Comparative Example 2

A non-aqueous electrolyte secondary battery Y2 was fabricated by following the same procedure as in Reference Example 1 except for changing the procedure in the above preparation of positive electrode in Reference Example 1 so as to use only $LiMn_{0.33}Ni_{0.33}Co_{0.34}O_2$ as a positive active material, and the charge-discharge cycle characteristic of the battery Y2 was evaluated.

The results of evaluations of the thermal stability of the non-aqueous electrolyte secondary batteries B1 and B2 of Reference Examples 1 and 2 and the non-aqueous electrolyte secondary battery Y1 of Reference Comparative Example 1 thus prepared are shown in Table 2. And, the results of evaluations of the charge-discharge cycle characteristics of the non-aqueous electrolyte secondary batteries B1 and B2 of Reference Examples 1 and 2 and the non-aqueous electrolyte secondary batteries Y1 and Y2 of Reference Comparative Examples 1 and 2 are shown in Table 3. And, values in the parentheses described in columns of discharge capacity at 100th cycle and discharge capacity at 300th cycle in Table 3 are capacity retention to an initial discharge capacity.

lower than 2.9 V causes the deterioration with cycle to become large even when the end of charge voltage is 4.2 V.

Here, as is apparent from the comparison between Comparative Example 1 of Experiment 1 and Reference Example 1 of Reference Experiment, the cycle characteristic of the battery X1 is significantly inferior to that of the battery B1 using the similar positive active material. The reason for this is assumed to be that in the battery X1, since by increasing a proportion of the active material in the battery of this case, the discharge capacity per volume of the battery was significantly increased compared with the battery B1 and therefore an amount of an electrolyte solution per volume of the battery was reduced, an effect of the decomposition of the electrolyte solution in repeating the charge and discharge on charge-discharge cycle deterioration became remarkable.

From this, it is considered that the present invention has a remarkable effect particularly in increasing the capacity per volume of the battery.

TABLE 2

| | Battery | Content of $LiMn_{0.33}Ni_{0.33}Co_{0.34}O_2$ in Positive Active Material | Thermal Stability | | |
| --- | --- | --- | --- | --- | --- |
| | | | 160° C. | 170° C. | 180° C. |
| Reference Example 1 | B1 | 30% | — | Non Abnormality | Ignition |
| Reference Example 2 | B2 | 20% | — | Non Abnormality | Ignition |
| Reference Comparative Example 1 | Y1 | 0% | Non Abnormality | Ignition | — |

TABLE 3

| | Battery | Content of $LiMn_{0.33}Ni_{0.33}Co_{0.34}O_2$ in Positive Active Material | Cut Off Voltage in Discharge | Initial Discharge Capacity (mAh) | Discharge Capacity at 100th Cycle (mAh) | Discharge Capacity at 300th Cycle (mAh) |
| --- | --- | --- | --- | --- | --- | --- |
| Reference Example 1 | B1 | 30% | 3.1 V | 658.0 | 616.4 (93.7%) | 585.5 (89.0%) |
| Reference Example 2 | B2 | 20% | 3.1 V | 666.6 | 620.4 (93.1%) | 591.1 (88.7%) |
| Reference Comparative Example 1 | Y1 | 0% | 2.75 V | 678.9 | 639.1 (94.1%) | 619.8 (91.3%) |
| Reference Comparative Example 2 | Y2 | 100% | 3.1 V | 552.7 | 461.7 (83.5%) | 274.3 (49.6%) |

As is apparent from the comparison between Reference Examples 1 & 2 and Reference Comparative Example 1 shown in Table 2, it is found that in charging the battery up to 4.45 V, by mixing and using the lithium transition metal complex oxide A and the lithium transition metal complex oxide B as a positive active material, the thermal stability of the battery is improved compared with the case where only the lithium transition metal complex oxide A is used.

And, as is apparent from the comparison between Reference Examples 1 & 2 and Reference Comparative Examples 1 & 2 shown in Table 3, it is found that in charging the battery up to 4.4 V, by mixing and using the lithium transition metal complex oxide A and the lithium transition metal complex oxide B as a positive active material, the charge-discharge cycle characteristic is improved compared with the case where only the lithium transition metal complex oxide B is used. From these results, it is found that by mixing and using the lithium transition metal complex oxide A and the lithium transition metal complex oxide B, both of high thermal stability and high cycle characteristic can be attained.

Figure 1:
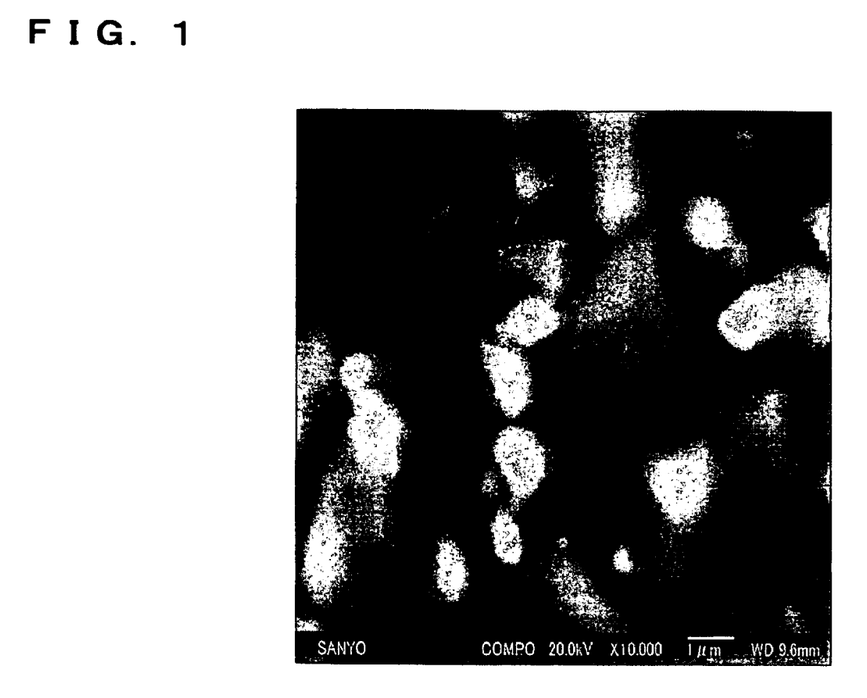
FIG. 1 shows a backscattered-electron image of a scanning electron microscope (SEM) of $LiCo_{0.99}Zr_{00.005}Mg_{0.005}O_2$ (a scale in the image represents 1 μm)

In addition, the reason why a discharge cut off voltage is set at 3.1 V or higher in the battery using the lithium transition metal complex oxide B is that when the lithium transition metal complex oxide B is used, the discharge cut off voltage Observation by Electron Microscope $LiCo_{0.99}Zr_{0.005}Mg_{0.005}O_2$ used in Reference Example 1 was observed by an electron microscope.

Figure 2:
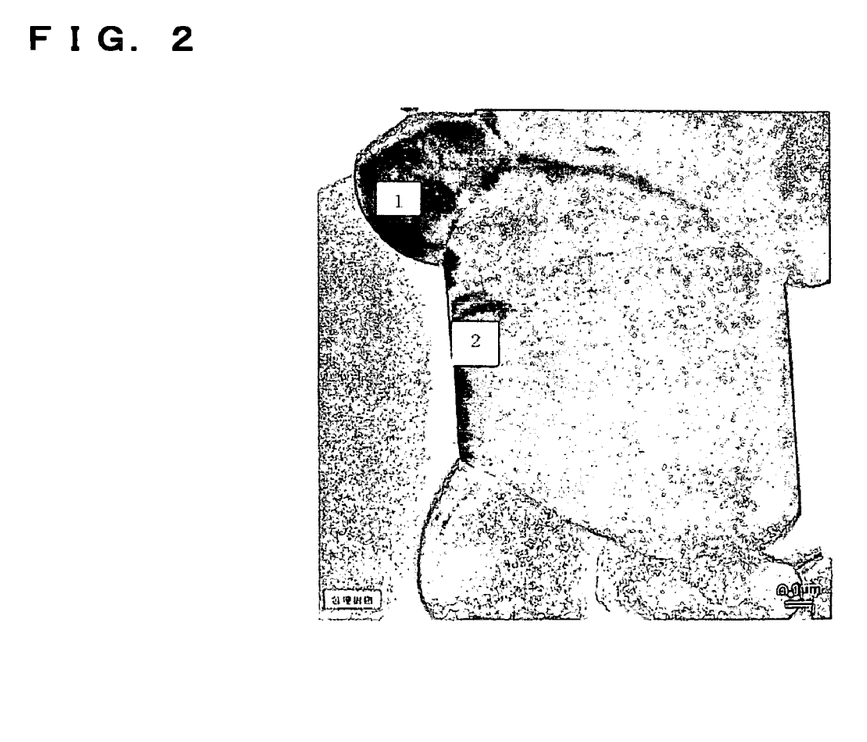
FIG. 2 shows an image of a transmission electron microscope (TEM) of $LiCo_{0.99}Zr_{0.005}Mg_{0.005}O_2$ (a scale in the image represents 0.1 μm)

FIG. 1 is a backscattered-electron image of a scanning electron microscope (SEM) of $LiCo_{0.99}Zr_{0.005}Mg_{0.005}O_2$ used in Reference Example 1 and FIG. 2 is an image of a transmission electron microscope (TEM) of $LiCo_{0.99}Zr_{0.005}Mg_{0.005}O_2$. As is apparent from FIG. 1 and FIG. 2, small particles adhere to the surfaces of large particles.

Figure 3:
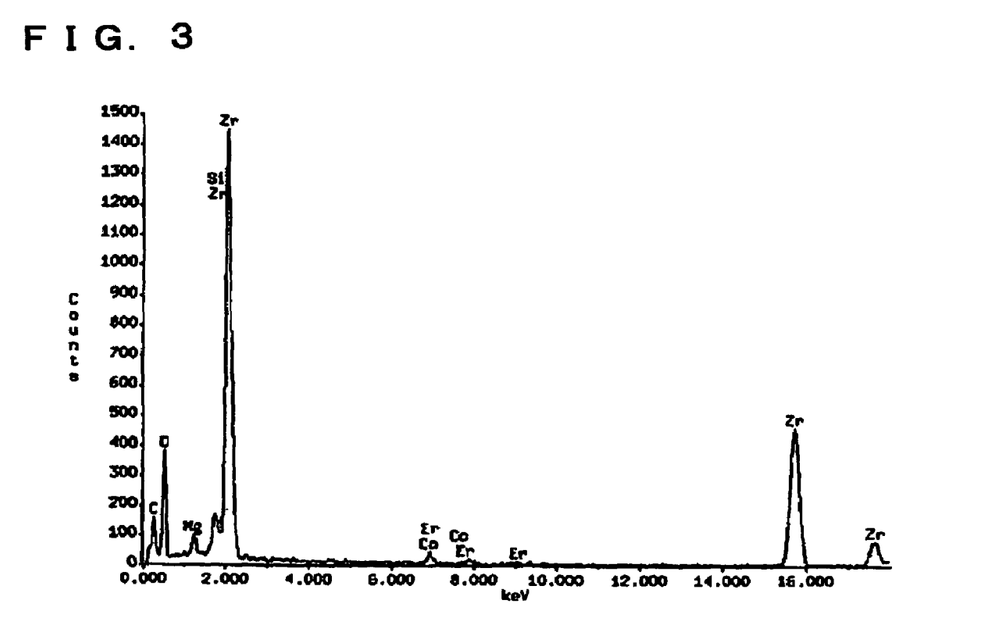
FIG. 3 shows a graph of the result of measurement of energy-dispersive X-ray spectroscopy (EDS) at the spot 1 in FIG. 2
Figure 4:
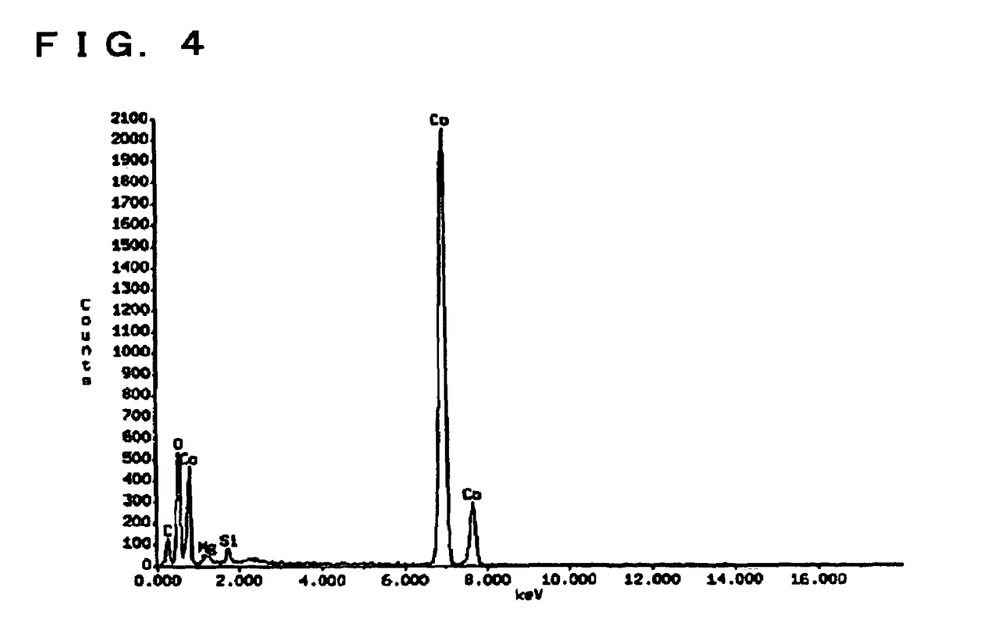
FIG. 4 shows a graph of the result of measurement of EDS at the spot 2 in FIG. 2.

The qualification of metal elements contained the image of a transmission electron microscope (TEM) shown in FIG. 2 was evaluated by EDS (energy-dispersive X-ray spectroscopy). The results of measurement of EDS are shown in FIG. 3 and FIG. 4. FIG. 3 shows a graph of measurement results of EDS at the spot 1 in FIG. 2 and FIG. 4 shows a graph of measurement results of EDS at the spot 2 in FIG. 2. As is apparent from FIG. 3 and FIG. 4, in the TEM image of FIG. 2, a Co element is hardly detected and a Zr element is much detected at the spot 1. On the other hand, at the spot 2, the Zr element is not detected at all and the Co element is much detected. From this, it is found that the adhering particles of the spot 1 are particles of a compound containing Zr and the adhering particles of the spot 2 are particles of $LiCoO_2$ not containing Zr. That is, it is found that the surface of the LiCoO$_2$ particle is in a state that particles of a compound of Zr adhere to a part of the surface and most (80% or more) of the surface is exposed.

And, as is apparent from FIG. 3 and FIG. 4, Mg is detected in both of the spot 1 and the spot 2. Therefore, it is found that Mg elements are diffused into and contained in both of the particles of a compound of Zr and the LiCoO$_2$ particles.

What is claimed is:

1. A non-aqueous electrolyte secondary battery including a positive electrode containing a positive active material, a negative electrode containing a negative active material and a non-aqueous electrolyte, characterized in that
lithium transition metal complex oxide A formed by allowing LiCoO$_2$ to contain at least both of Zr and Mg and lithium transition metal complex oxide B having a layered structure and containing at least both of Mn and Ni as transition metals are mixed and used as said positive active material, and vinylene carbonate and divinyl sulfone are contained in said non-aqueous electrolyte.

2. The non-aqueous electrolyte secondary battery according to claim 1, characterized in that 1,4-butanedioldimethanesulfonate is further contained in said non-aqueous electrolyte.

3. The non-aqueous electrolyte secondary battery according to claim 1, characterized in that the content of said vinylene carbonate is 0.5 to 5% by weight with respect to the entire non-aqueous electrolyte.

4. The non-aqueous electrolyte secondary battery according to claim 1, characterized in that the content of said divinyl sulfone is 0.1 to 1% by weight with respect to the entire non-aqueous electrolyte.

5. The non-aqueous electrolyte secondary battery according to claim 2, characterized in that the content of said 1,4-butanedioldimethanesulfonate is 0.1 to 1.5% by weight with respect to the entire non-aqueous electrolyte.

6. The non-aqueous electrolyte secondary battery according to claim 1, characterized in that a solvent of said non-aqueous electrolyte is a mixed solvent of a cyclic carbonate and a chain carbonate and an amount of the cyclic carbonate in the mixed solvent is 20 to 30% by volume.

7. The non-aqueous electrolyte secondary battery according to claim 1, characterized in that Zr contained in said lithium transition metal complex oxide A adheres to the surface of the lithium transition metal complex oxide A in the form of a particle as a compound of Zr.

8. The non-aqueous electrolyte secondary battery according to claim 1, characterized in that said lithium transition metal complex oxide B is expressed by a chemical formula: Li$_b$Mn$_s$Ni$_t$Co$_u$O$_2$, wherein b, s, t and u are numerals satisfying equations of $0 \leq b \leq 1.2$, $s+t+u=1$, $0<s \leq 0.5$, $0<t \leq 0.5$ and $u \geq 0$.

9. The non-aqueous electrolyte secondary battery according to claim 1, characterized in that an amount of Mn in said lithium transition metal complex oxide B is substantially equal in a molar ratio to an amount of Ni in said lithium transition metal complex oxide B.

10. The non-aqueous electrolyte secondary battery according to claim 1, characterized in that the content of said lithium transition metal complex oxide A in said positive active material is 51 to 90% by weight.

11. The non-aqueous electrolyte secondary battery according to claim 1, characterized in that said positive active material and said negative active material are contained in such a way that the ratio between charge capacities of the positive electrode and the negative electrode in the case of selecting 4.3 V as an end of charge voltage is 1.0 to 1.2.

12. The non-aqueous electrolyte secondary battery according to claim 1, characterized in that said positive active material and said negative active material are contained in such a way that the ratio between charge capacities of the positive electrode and the negative electrode in the case of selecting 4.4 V as an end of charge voltage is 1.0 to 1.2.

* * * * *